US009684517B2

(12) United States Patent
Chen et al.

(10) Patent No.: US 9,684,517 B2
(45) Date of Patent: Jun. 20, 2017

(54) SYSTEM MONITORING AND DEBUGGING IN A MULTI-CORE PROCESSOR SYSTEM

(71) Applicant: LENOVO ENTERPRISE SOLUTIONS (SINGAPORE) PTE. LTD., New Tech Park (SG)

(72) Inventors: Alpus P C Chen, Taipei (TW); Chun-Wei Chen, Taipei (TW); Elysee Y H Hsieh, Taipei (TW); Kelvin Shieh, Taipei (TW)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 50 days.

(21) Appl. No.: 14/527,107

(22) Filed: Oct. 29, 2014

(65) Prior Publication Data

US 2015/0121152 A1   Apr. 30, 2015

(30) Foreign Application Priority Data

Oct. 31, 2013   (TW) .............................. 102139645 A

(51) Int. Cl.
  *G06F 11/00*   (2006.01)
  *G06F 9/44*   (2006.01)
  *G06F 11/36*   (2006.01)

(52) U.S. Cl.
  CPC ............ *G06F 9/4406* (2013.01); *G06F 11/36* (2013.01); *G06F 11/3636* (2013.01); *G06F 11/3664* (2013.01)

(58) Field of Classification Search
  CPC .. G06F 11/0712; G06F 11/0724; G06F 11/36; G06F 11/3636; G06F 11/3664; G06F 9/4406; G06F 9/46
  See application file for complete search history.

(56) References Cited

U.S. PATENT DOCUMENTS

| | | | |
|---|---|---|---|
| 7,546,487 B2 | 6/2009 | Marisetty et al. | |
| 7,624,250 B2 | 11/2009 | Lau et al. | |
| 7,877,637 B2 | 1/2011 | Shibata et al. | |
| 7,984,122 B2 | 7/2011 | Titus | |
| 2006/0059286 A1 | 3/2006 | Bertone et al. | |
| 2006/0069953 A1 | 3/2006 | Lippett et al. | |
| 2008/0065858 A1* | 3/2008 | Zimmer | G06F 8/60 712/13 |
| 2008/0163255 A1 | 7/2008 | Munoz et al. | |

(Continued)

FOREIGN PATENT DOCUMENTS

| | | |
|---|---|---|
| TW | 201108118 | 3/2011 |
| TW | 201112118 | 4/2011 |
| WO | 2012004954 A1 | 1/2012 |

OTHER PUBLICATIONS

He, Guojin, "Efficient dynamic program monitoring on multi-core platforms", Dissertation—University of Minnesota, May 2012, 122 pp.

(Continued)

*Primary Examiner* — Michael Maskulinski
(74) *Attorney, Agent, or Firm* — Katherine Brown

(57) ABSTRACT

A multi-core processor system includes a first resource, a first core, a second resource, and a second core. The first core runs a first operating system (OS), and the first resource is allocated to the first OS. The second core runs a second OS, and the second resource is exclusively allocated to the second OS. The first OS and the second OS are designed for running at the same time, and the second OS is configured for monitoring or debugging the first resource, the first core, or the first OS.

12 Claims, 2 Drawing Sheets

(56) References Cited

U.S. PATENT DOCUMENTS

| | | | |
|---|---|---|---|
| 2008/0186194 A1 | 8/2008 | Kaminski et al. | |
| 2008/0229159 A1* | 9/2008 | Viljoen | G06F 11/0712 714/57 |
| 2008/0320487 A1 | 12/2008 | Fontenot et al. | |
| 2010/0322088 A1 | 12/2010 | Muthiah et al. | |
| 2011/0173360 A1 | 7/2011 | Thomson et al. | |
| 2012/0226837 A1 | 9/2012 | Cruickshank et al. | |
| 2012/0317568 A1 | 12/2012 | Aasheim | |
| 2013/0111264 A1* | 5/2013 | Settsu | G06F 11/0778 714/11 |
| 2013/0238882 A1* | 9/2013 | Suzuki | G06F 9/30043 712/228 |

OTHER PUBLICATIONS

West, P.E. et al., "Core Monitors: Monitoring Performance in Multicore Processors", CF '09, May 18-20, 2009, Ischia, Italy, 9 pp.

Mayer et al, "Multi-Core Debug Solution IP: SoC Software Debugging and Performance Optimization", A White Paper presented by IPextreme, May 2007, 23 pp.

Nagarajan, Vijay et al. "Runtime Monitoring on Multicores via OASES", ACM SIGOPS Operating Systems Review, vol. 43 Issue 2, Apr. 2009, pp. 15-24.

"System Event Log Troubleshooting Guide for Intel® S5500/S3420 Series Server Boards", Intel Corporation, Revision 1.0, Aug. 2012, 114 pp.

"Variable SMP—A Multi-Core CPU Architecture for Low Power and High Performance", Nvidia White Paper, 2011, 16 pp.

\* cited by examiner

SYSTEM MONITORING AND DEBUGGING IN A MULTI-CORE PROCESSOR SYSTEM

This application claims priority to Taiwan patent application number 102139645, filed on Oct. 31, 2013.

BACKGROUND OF THE INVENTION

In server devices like System X® server products, Blade Center® server products, and eServer® server products available from Lenovo Group Ltd., of Beijing, China, and of Morrisville, N.C., a baseboard management controller (BMC) performs system monitoring and bug-checking (or so-called "debugging"). The BMC communicates with multiple sensors in the system and thus collects multiple system parameters, such as temperature, power mode, fan rotation speed, and limited operating system statuses (OS statuses), such as boot, shutdown, and bug checking. The BMC has a non-volatile memory (such as flash memory) for storing a system event log.

SUMMARY OF THE INVENTION

An example multi-core processor system includes a first resource, and a first core to run a first operating system (OS) to which the first resource is allocated. The system includes a second resource, and a second core electrically connected to the first core and to run a second operating system (OS). The second resource is allocated to the second OS and dedicated to the second OS, such that the first OS is unable to access the second resource. The first OS and the second OS run simultaneously. The second OS is configured to monitor a status of one of the first resource, the first core, and the first OS.

An example computer program product includes a storage device storing computer-executable code executed by a computing device. The device has a first resource, a first core running a first OS to which the first resource is allocated, a second resource, and a second core electrically connected to the first core and to run a second OS to which the second resource is allocated and dedicated. The computing device is to execute the computer-executable code to perform a method. The method includes allocating the second resource and the second core to the second OS, and running the second OS by the second core. The method includes monitoring a status of one of the first resource, the first core, and the first OS by the second OS.

An example method includes running a first OS with a first core of a multi-core processor system. The method includes allocating a second core of the multi-core processor system to a second OS. The method includes running the second OS with the second core, the first OS and the second OS running simultaneously.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
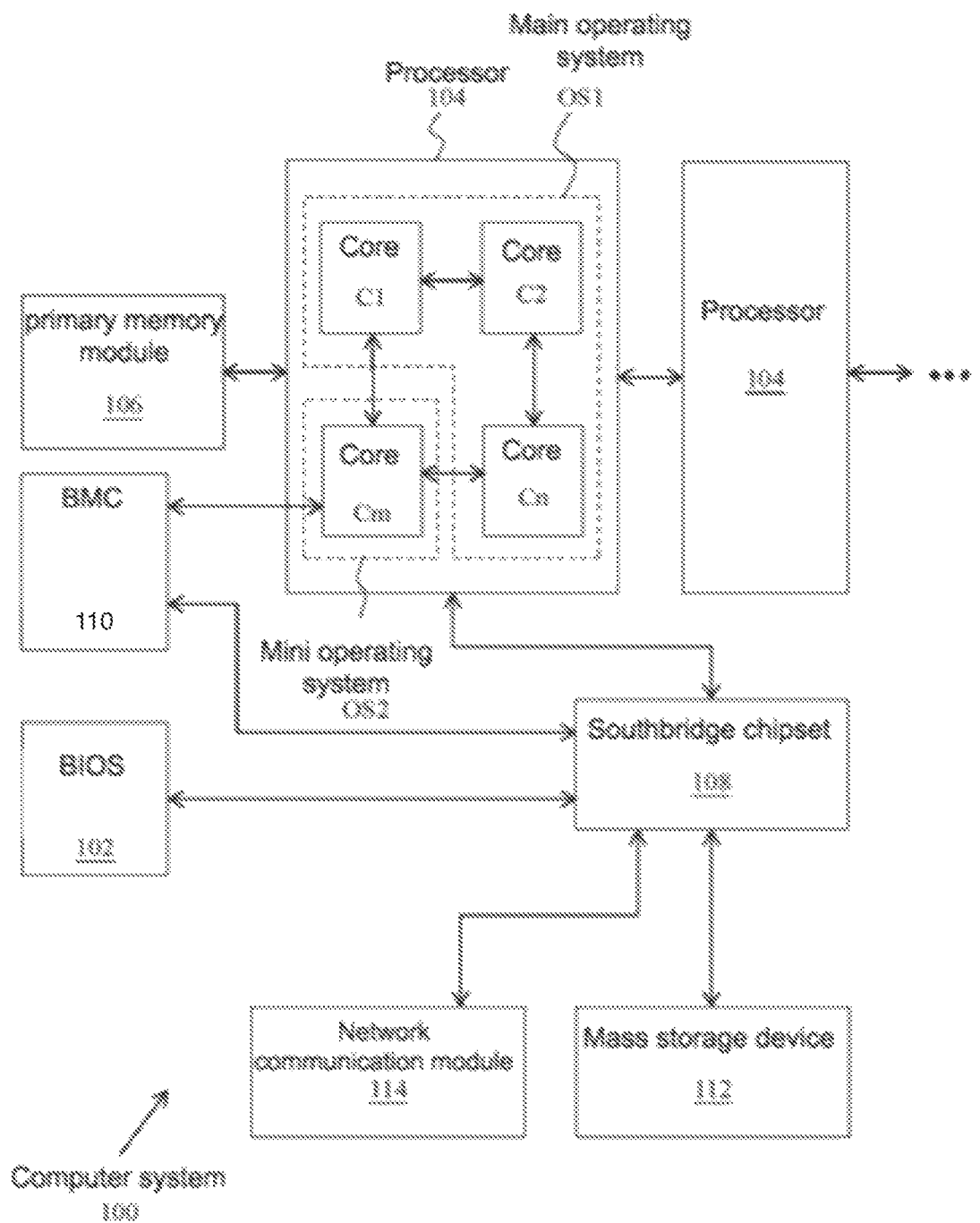
FIG. 1 is a schematic view of a computer system according to an example of the disclosure.

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

As noted in the background section, server devices can include baseboard management controllers (BMCs) that perform system monitoring and bug checking. Performing system monitoring and bug checking with a BMC is widely employed, but suffers from drawbacks. For instance, the BMC neither takes the initiative in monitoring the status (especially the runtime status) of an operating system (OS), nor does the BMC monitor the status (especially the runtime status) of the OS in a real-time manner. Moreover, physical errors attributed to a hardware device and detected by the BMC are limited.

A conventional BMC passively receives information from the OS. The conventional BMC is in the form of an embedded system and thus has a limited storage space. As a result, the conventional BMC can hold only a limited number of system event logs. Furthermore, when the operating system OS crashes, the BMC is unlikely to be instructed in time to record the crash. Also, system data that is useful for analyzing the cause of the crash can become lost as a result of a system reboot. For example, a log file that is stored in a volatile memory by the OS is lost forever as soon as the power is turned off, thereby adding to the difficulty of bug checking.

Existing monitoring and bug-checking tools provided in the form of software have to be executed under the OS and thus are subject to limitations. For instance, Dynamic System Analysis (DSA) software tools can be installed in such server devices to perform system bug checking DSA software tools must operate under an OS. DSA software tools are designed to least interfere with the operation of an OS, and greatly restrict the extent of monitoring and bug checking performed by DSA software tools. DSA software tools cannot function whenever the OS stops operating. Such software tools, in other words, become useless as soon as the OS stops operating.

Disclosed herein are techniques that overcome these drawbacks, while maintaining the hardware framework of multi-core processor systems unchanged. In a multi-core processor system, while a main operating system (main OS) is operating, a dedicated core and related dedicated resources (such as memory or cache) are set aside to run a simple mini operating system (mini OS) for monitoring and bug-checking the main OS and the other hardware resources. The mini OS runs on a processor (i.e., a dedicated core) of the system and thus gains insight into the condition of the system more readily and comprehensively than the BMC does.

The multi-core processor system can according to the techniques disclosed herein permit the main OS and the mini OS to operate simultaneously and independently. The main OS no longer uses/accesses the dedicated core and related dedicated resources allocated to the mini OS; hence, the mini OS and the main OS do not interfere with each other and bring about conflicts. Under this framework, the mini OS monitors in a real-time manner the statuses of the main OS, including the runtime status. Even if the main OS malfunctions, the mini OS will not only remain unaffected and continue to operate but also create a dump file according to the current status of the main OS and its hardware resources such that the dump file can be for use in subsequent analysis and debugging. Hence, a multi-core processor system of the techniques disclosed herein overcomes two drawbacks of existing monitoring solutions, namely use of a BMC precludes detecting system statuses fully when the main OS crashes, and software-based monitoring and bug-checking tools stop functioning as soon as the main OS crashes.

In accordance with techniques disclosed herein, in a multi-core processor system (such as a homogeneous multi-core processor system), different operating systems can run simultaneously and independently, using different cores. In particular, system firmware (such as a basic input/output system (BIOS)) or the main OS reserves a dedicated core for running another operating system, while the system firmware or the main OS may decide later not to run another operating system on the dedicated core as needed. The other operating system not only monitors the main OS but is also designed to perform the other functions in some implementations.

FIG. 1 illustrates an example hardware framework of a computer system 100. The computer system 100 includes a BIOS 102, one or more central processing units (CPU) 104, a primary memory module 106 (such as DIMM (dual in-line memory module)), a Southbridge chipset 108, a BMC 110, a mass storage device 112, and a network communication module 114. Details not related to the inventive techniques disclosed herein are omitted from the description below for the sake of brevity. Each processor 104 can have multiple cores C1-Cn, such as four cores, six cores, or a different number of cores. The example depicted in FIG. 1 is thus illustrative rather than restrictive of the quantity of processors of the computer system of the present invention. In one implementation, the total number of cores increases with the number of processors.

In one implementation, all the cores on the computer system 100 are homogeneous cores, and thus not only is there no difference in performance and physical properties between the cores, but the cores are also made by the same semiconductor manufacturing process. Hence, from the perspective of the computer system 100, the cores are interchangeable; that is, the cores can be designated freely without compromising the functions of the computer system 100. In another aspect, in this implementation, all the cores on the computer system 100 are suitable for use by a single operating system in effectuating symmetric multi-core processing, but note that such usage is not the focus herein.

Figure 2:
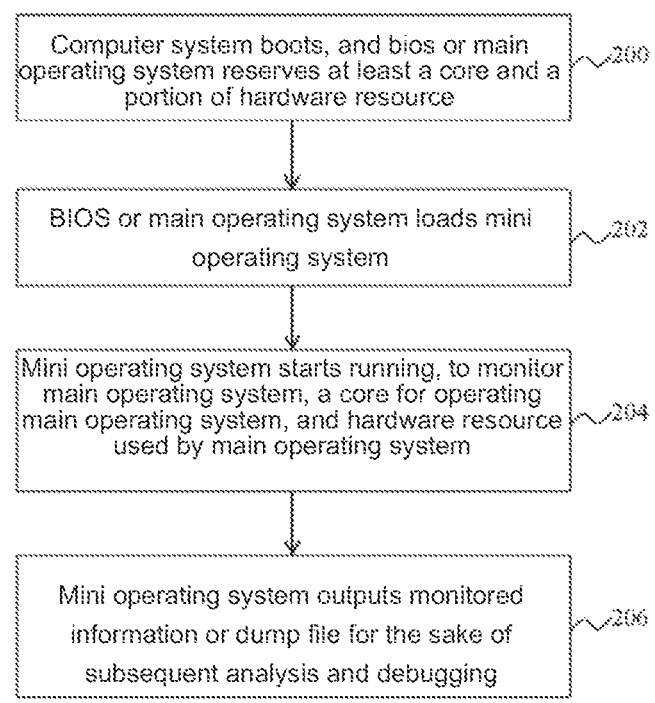
FIG. 2 is a schematic view of the process flow of a method according to an example of the disclosure.

The process flow of the method of the present invention in an embodiment thereof is described hereunder and illustrated with the flowchart of FIG. 2. In part 200, the computer system 100 boots, and the BIOS 102 loads main OS1. In particular, at least a core Cm and hardware resources dedicated to the core Cm are selected by the BIOS 102 according to a predetermined configuration, and then reserved for another operating system OS2 (hereinafter referred to as mini OS2). For instance, the BIOS 102 reserves one or more specific interrupts (not shown), specific segments of the memory module 106, specific segments of the mass storage device 112, and one or more specific input/output ports (I/O ports) of the processor 104 for use by at least the core Cm and mini OS2. The reserved core(s) and hardware resource(s) are no longer available to main OS1, and thus main OS1 can access only the remaining unreserved cores and hardware resources.

Even if main OS1 is still able to access the memory module 106 and the mass storage device 112, main OS1 cannot access specific segments located at the memory module 106 and the mass storage device 112 and reserved for mini OS2. In one implementation, where all the cores of the computer system 100 are homogeneous cores, any one of the cores can be selected and reserved for mini OS2, so that the reserved core is dedicated to mini OS2. Regarding the number of reserved cores, in one implementation, only one core is reserved for mini OS2, and thus main OS1 can access all the remaining cores for performing multi-core processing operation. As the number of unreserved cores is just reduced by one, the performance of main OS1 is unlikely to be greatly affected. In another implementation, at least two cores are reserved for mini OS2.

In still another implementation, instead of reserving a core and hardware resources for mini OS2, the BIOS 102 loads main OS1 to the primary memory module 106. Then, main OS1 performs a booting process on a core (such as core C1, which is typically allocated by the BIOS 102). Afterwards, depending on the predetermined configuration, main OS1 reserves another core (such as core Cm) and hardware resources required for mini OS2.

In part 202, the BIOS 102 or main OS1 loads operating system OS2 to a segment located at the primary memory module 106 and reserved for operating system OS2, such that the reserved core Cm accesses and runs operating system OS2. An image file of operating system OS2 is stored beforehand in the mass storage device 112 of the computer system 100 such that the image file can be accessed by the BIOS 102 or main OS1. For the sake of security, the image file of operating system OS2 can be encrypted in advance, such that the image file must be decrypted by the BIOS 102 or main OS1 in order to load operating system OS2. The encryption/decryption process ensures the integrity of operating system OS2. Any other techniques conducive to integrity of data contained in a file (i.e., without changing fraudulently) are applicable as well.

In part 204, while main OS1 is operating, mini OS2 begins to run independently of main OS1, so as to monitor the status of main OS1. Furthermore, operating system OS2 monitors the status of core C1 for running main OS1 and the status of hardware resource (such as the primary memory module 106) accessible to main OS1. In particular, operating system OS2 creates a dump file intended for subsequent analysis and debugging and aimed at registers in core C1 (or any core for use by operating system OS1) and the primary memory module 106 (particularly, segments being used by operating system OS1).

In part 204, the way operating system OS2 monitors operating system OS1 and related cores and hardware resources is either active or passive. To effectuate real-time monitoring, operating system OS2 can take the initiative in effectuating monitoring at predetermined time intervals. The monitored time intervals are dynamically adjusted according to past records. For instance, if a crash happened recently, it may be necessary to take the initiative in effectuating monitoring more often. By contrast, a system that has been operating steadily for a longer period of time can be monitored less often.

In the situation where monitoring is carried out passively, operating system OS2 performs monitoring in response to a specific hardware-related signal (such as system temperature) in the computer system 100 or a software-related event (for example, when a new application has just been installed on operating system OS1 or when software installed on operating system OS1 has just been updated). If operating system OS2 performs monitoring according to a signal from the BIOS 102 (for example, the BIOS 102 detects a hardware-related change of the computer system 100). If operating system OS2 performs monitoring according to a command issued by an authorized user.

In part 206, for subsequent analysis and debugging, operating system OS2 stores, or sends to a designated location, such as a segment located at the primary memory module 106 and dedicated to operating system OS2, data collected by the monitoring process performed in step 204 or a dump file created. In one implementation, core Cm for running operating system OS2 is connected to the Southbridge chipset 108 through a GPIO of the processor 104, and thus operating system OS2 sends the dump file to the BMC 110 or the mass storage device 112 through the Southbridge chipset 108, or to a network device (not shown) outside the BMC 110 through the network communication module 114.

In another implementation, the Southbridge chipset 108 is not present, and the GPIO of the processor 104 is emulated by operating system OS2 to function as a communication bus, such as SPI, I2C, UART, PCIe. Hence, operating system OS2 can communicate directly with available input/output devices (not shown) or the other PCIe devices in the computer system 100 or the BMC 110 so as to send out the dump file. The BMC 110 further sends the dump file to the other external or remote devices (not shown) through an extended port (not shown) of the BMC 110 or the network communication module 114.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

In the figures, systems/devices, methods, and computer program products have been illustrated as structural or functional block diagrams or process flowcharts according to various examples of the present disclosure. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

As will be appreciated by one skilled in the art, the present invention may be embodied as a system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

What is claimed is:

1. A multi-core processor system comprising:
a basic input/output system (BIOS);
a first resource;
a first core to run a first operating system (OS) to which the first resource is allocated;
a second resource; and
a second core electrically connected to the first core and to run a second operating system (OS), wherein the second resource is allocated to the second OS and dedicated to the second OS, such that the first OS is unable to access the second resource,
wherein the first OS and the second OS run simultaneously, and the second OS is configured to monitor a status of one of the first resource, the first core, and the first OS,
wherein the BIOS allocates the second resource and the second core and loads the second OS.

2. The system of claim 1, wherein the second OS performs bug-checking on a status of one of the first resource, the first core, and the first OS.

3. The system of claim 1, wherein the first core and the second core are homogeneous and interchangeable.

4. The system of claim 1, wherein the first core and the second core are physically disposed at a same processor.

5. The system of claim 1, wherein the second OS creates a dump file of one of the first resource, the first core, and the first OS.

6. The system of claim 5, wherein the second OS sends the dump file out of the system.

7. A computer program product comprising a storage device storing computer-executable code executed by a computing device having a first resource, a first core running a first operating system (OS) to which the first resource is allocated, a second resource, and a second core electrically connected to the first core and to run a second OS to which the second resource is allocated and dedicated, the computing device to execute the computer-executable code to perform a method comprising:
allocating the second resource and the second core to the second OS, and loading the second OS by the first OS;
running the second OS by the second core; and
monitoring a status of one of the first resource, the first core, and the first OS by the second OS.

8. The computer program product of claim 7, wherein monitoring the status comprises performing bug-checking on a status of one of the first resource, the first core, and the first OS by the second OS.

9. The computer program product of claim 7, wherein the first core and the second core are homogeneous and interchangeable.

10. A method comprising:
running a first operating system (OS) with a first core of a multi-core processor system;
allocating and loading a second core of the multi-core processor system to a second OS, by the first OS; and
running the second OS with the second core, the first OS and the second OS running simultaneously.

11. The method of claim 10, wherein the first core and the second core are homogeneous and interchangeable.

12. The method claim 10, wherein allocating the second core comprises allocating a dedicated resource in the multi-core processor system by the second OS, and the first OS cannot access the dedicated resource.

* * * * *